United States Patent
Robinson et al.

(10) Patent No.: US 12,134,675 B2
(45) Date of Patent: Nov. 5, 2024

(54) BIOBASED POLYURETHANE ELASTOMER MEMORY FOAM COMPOSITIONS

(71) Applicant: Evoco Limited, Toronto (CA)

(72) Inventors: Jason James Robinson, Toronto (CA);
Radu Lucian Vicol, Toronto (CA);
Mustafa Abu Ghalia, Toronto (CA);
Guerino G. Sacripante, Oakville (CA)

(73) Assignee: Evoco Limited, Toronto (CA)

( * ) Notice: Subject to any disclaimer, the term of this patent is extended or adjusted under 35 U.S.C. 154(b) by 48 days.

(21) Appl. No.: 17/677,264

(22) Filed: Feb. 22, 2022

(65) Prior Publication Data
US 2023/0265236 A1    Aug. 24, 2023

(51) Int. Cl.
| | |
|---|---|
| C08G 18/20 | (2006.01) |
| C08G 18/32 | (2006.01) |
| C08G 18/42 | (2006.01) |
| C08G 18/66 | (2006.01) |
| C08G 18/68 | (2006.01) |
| C08G 18/76 | (2006.01) |
| C08G 63/672 | (2006.01) |
| C08K 5/00 | (2006.01) |
| C08K 5/11 | (2006.01) |
| C08G 101/00 | (2006.01) |

(52) U.S. Cl.
CPC ......... *C08G 18/68* (2013.01); *C08G 18/7671* (2013.01); *C08G 2101/00* (2013.01); *C08G 2110/0008* (2021.01); *C08G 2110/005* (2021.01); *C08G 2110/0058* (2021.01)

(58) Field of Classification Search
None
See application file for complete search history.

(56) References Cited

U.S. PATENT DOCUMENTS

| | | | | |
|---|---|---|---|---|
| 5,326,815 A * | 7/1994 | Serdiuk | ............... | C09D 175/06 |
| | | | | 524/591 |
| 9,394,397 B2 * | 7/2016 | Ohara | ............... | C07C 69/34 |
| 9,458,277 B2 * | 10/2016 | Bräuer | ............... | C08G 18/3206 |
| 10,934,384 B1 * | 3/2021 | Robinson | ........... | C08G 18/7671 |
| 10,934,385 B1 * | 3/2021 | Robinson | ........... | C08G 18/4202 |
| 11,072,694 B1 * | 7/2021 | Robinson | ............... | C08G 18/18 |
| 2002/0193459 A1 * | 12/2002 | Haseyama | ............ | B29C 44/348 |
| | | | | 521/155 |
| 2011/0269933 A1 * | 11/2011 | Park | ........................ | C08G 63/82 |
| | | | | 528/286 |
| 2011/0301255 A1 * | 12/2011 | Barriau | .................. | C08J 9/0061 |
| | | | | 521/137 |
| 2022/0073674 A1 * | 3/2022 | Robinson | ........... | C08G 18/4202 |

FOREIGN PATENT DOCUMENTS

| | | | |
|---|---|---|---|
| JP | 2006182874 A * | 7/2006 | |
| WO | WO 2018/005538 A2 | 1/2018 | |
| WO | WO-2019175346 A1 * | 9/2019 | ........... C07D 209/12 |

OTHER PUBLICATIONS

Machine translation for JP-2006182874-A obtained from the European Patent Office in Jun. 2023 (Year: 2023).*
1 European Search Opinion issued Jul. 14, 2023 in respect of counterpart European Patent Application No. 4230671.

* cited by examiner

*Primary Examiner* — Melissa A Rioja

(57) ABSTRACT

A polyurethane elastomer memory foam composition includes an organic diisocyanate, a chain extender, a crosslinker, a plasticizer, a surfactant, a foaming agent, and a polyester resin, the polyester resin being a random copolymer having randomly distributed subunits of formula 1:

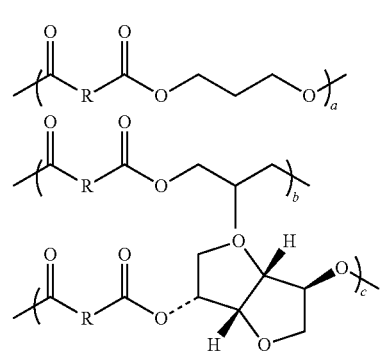

where: R is ethylene, octylene, or decylene; a is from about 1 to about 99 mole % of the polyester resin; b is from about 1 to about 99 mole % of the polyester resin; c is from 0 to about 10 mole % of the polyester resin; and a+b+c=100 mole % of the polyester resin.

19 Claims, 1 Drawing Sheet

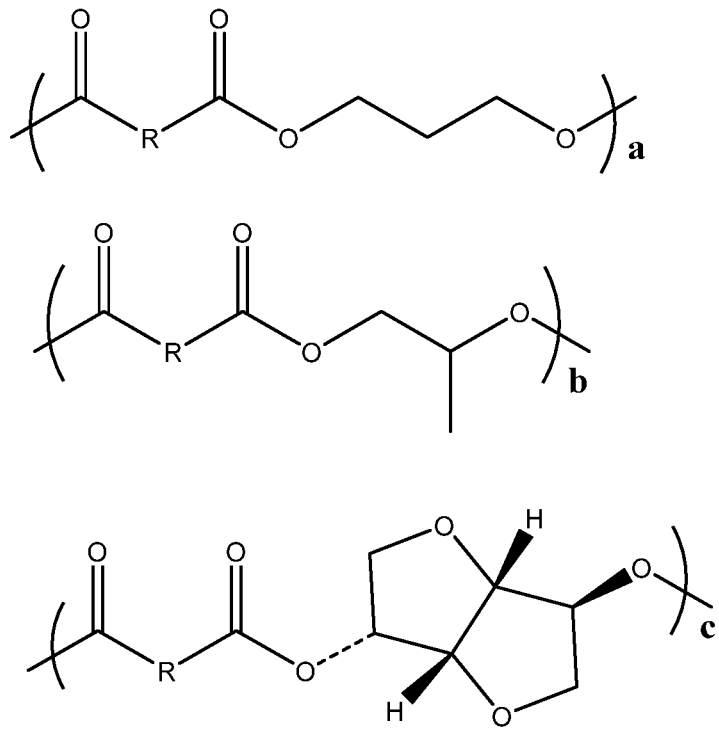
1
where:
R is ethylene, octylene, or decylene,
a is from about 1 to about 99 mole % of the polyester resin,
b is from about 1 to about 99 mole % of the polyester resin,
c is from 0 to about 10 mole % of the polyester resin, and
a + b + c = 100 mole % of the polyester resin.

BIOBASED POLYURETHANE ELASTOMER MEMORY FOAM COMPOSITIONS

FIELD

The present invention relates generally to memory foam, and in particular to biobased polyurethane elastomer memory foam compositions.

BACKGROUND

Memory foam is often referred to as a viscoelastic polyurethane foam, or low-resilience polyurethane foam. The foam bubbles or "cells" are open, which effectively creates a matrix through which air can flow. Higher-density memory foam softens in reaction to body heat, allowing it to mold to a warm body in a few minutes. Memory foam typically recovers its original shape more quickly than regular polyurethane foam. Memory foam derives its viscoelastic properties from several effects, owing to the internal structure of the material. The network effect is the force working to restore the structure of the foam when it is deformed. This effect is generated by the deformed porous material pushing outwards to restore its structure against an applied pressure. There are three effects which work against the network effect: the pneumatic effect, the adhesive effect, and the relaxation effect. These, combined, effectively slow the restoration of the original structure of the foam, and allow for applications such as memory foam mattresses. The pneumatic effect is caused by the time it takes for air to flow into the porous structure of the foam. The adhesive effect, or adhesion, is caused by the stickiness of the surfaces within the memory foam, which work against decompression, as the internal pores within the memory foam are pressed together by an applied pressure. The relaxation effect has the largest magnitude of the three effects working against expansion, and is caused by the memory foam's material being near its glass transition temperature. This limits the mobility of the memory foam's material, and forces any change to be gradual, slowing the expansion of the foam once the applied pressure has been removed. Since this behavior is temperature-dependent, the temperature at which a memory foam retains its properties is limited. If it is too cold, the memory foam will harden. If it is too hot, the memory foam will act like conventional foams, and will easily spring back to its original shape.

The underlying physics of this process can be described by polymeric creep. The pneumatic and adhesive effect are strongly correlated with the size of the pores within memory foam. Smaller pores lead to higher internal surface area and reduced air flow, increasing adhesion and the pneumatic effect respectively. Thus, by varying the cell structure and porosity of the memory foam, the properties can be controlled. Moreover, by using additives in the polymeric material of the memory foam, the glass transition temperature can also be controlled, affecting the properties of the foam. The mechanical properties of memory foam can affect the comfort and durability of the foam. There is also a trade-off between comfort and durability. Certain memory foams may have a more rigid cell structure, leading to a weaker distribution of weight, but better recovery of the original structure, leading to improved cyclability and durability. Moreover, a denser cell structure can resist penetration of water vapor, leading to reduced weathering and better durability and overall appearance. The property of firmness (hard to soft) of memory foam is used in determining comfort. Firmness is measured by a foam's indentation force deflection (IFD) rating. However, it is not a complete measurement of a "soft" or "firm" feel. A foam of higher IFD but lower density can feel soft when compressed.

IFD standards and guidelines are defined by the Polyurethane Foam Association, wherein the IFD measures the force in Newtons (or pounds-force) required to make a dent 1 inch into a foam sample 38 cm×38 cm×10 cm (or 15 inch×15 inch×4 inch) by a 323 cm$^3$ (50 in$^2$, 8-inch-diameter) disc and known as IFD at 25% compression. IFD ratings for memory foams range between super soft (IFD 8) and semi-rigid (IFD 12). For example, most memory foam mattresses are firm (IFD 12 to IFD 16). A memory foam is usually denser than traditional polyurethane foams and is commonly manufactured in densities ranging from less than 25 kg/m$^3$ to 125 kg/m$^3$ density. Most standard memory foam has a density of 16 to 80 kg/m$^3$. Most bedding, such as topper pads and comfort layers in mattresses, has a density of about 48 to 72 kg/m$^3$.

Polyurethanes are a large class of polymer used in a wide range of applications, such as construction, automotive, furniture, footwear, insulation, coatings, adhesives, elastomer foams, and consumer goods. Polyurethanes are produced from the polymerization reaction between polyols and/or aliphatic diols with diisocyanates. Additives are commonly added during the polymerization reaction to improve certain properties. Such additives include chain-extending agents, blowing agents, surfactants, fillers, plasticizers, pigments, additives, colorants and flame retardants. Blowing agents create a polyurethane foam, while surfactants control the bubble formation and, therefore, the cell formation of the foam. In general, fillers increase stiffness, plasticizers reduce hardness and pigments add color to the material.

The main components of polyurethane, namely the polyols and the diisocyanates, are mainly derived from petrochemicals, and their production contributes heavily towards greenhouse gasses that negatively impact the environment. There is an overall need for polyurethane memory foams, wherein the components are based on renewable resource materials derived primarily from a biomass such that there is less dependency on fossil fuels, which accelerate climate change.

U.S. Pat. No. 9,458,277 describes a method for the preparation of polyurethane elastomers based on polyester diols formed from diacids, such as succinic acid, a carbohydrate, diols such as 1,3-propanediol, and an organic diisocyanate.

U.S. Pat. No. 9,394,397 describes a method for producing a biomass resource-derived polyurethane by reacting a dicarboxylic acid and an aliphatic diol to produce a polyester polyol and reacting the polyester polyol and a polyisocyanate compound, where the dicarboxylic acid contains at least one component derived from biomass resources, a content of an organic acid in the dicarboxylic acid is more than 0 ppm and not more than 1,000 ppm relative to the dicarboxylic acid, and a pKa value of the organic acid at 25° C. is not more than 3.7.

U.S. Pat. No. 9,458,277 describes homogeneous extruded items made of thermoplastically processable polyurethanes (TPUs) based on polyester diols made of succinic acid and 1,3-propanediol.

U.S. Pat. No. 5,326,815 describes a polyurethane coating composition derived from polyester polyol containing long-chain aliphatic polyol, and wherein the hydroxy-functional polyester component that is the reaction product of a mixture comprising a carboxylic acid component comprising at least two carboxylic acid functional groups, a long-chain aliphatic polyol having 18 to 60 carbon atoms, and a short-chain polyol having 12 or fewer carbon atoms.

There is a need to provide polyurethane elastomers that can be used in memory foams, and which can display for example, a combination of specific mechanical properties, such as an IFD at 25% compression of from about IFD 10 to IFD 15, a density of from about 25 to 125 kg/cm$^3$, a hysteresis loss of 40 to 60%, a recovery time of from about 3 to about 8 seconds, and a 50% compression set of less than 5%.

There is also a need to provide polyurethane foams that have excellent density, prolonged Asker C hardness, improved tensile strength, and acceptable and consistent elongation and tear strength properties, where the foams are, for example, selected for memory foam applications such as mattresses, footwear, upholstery, sitting articles, and medical devices.

Furthermore, there is a need to provide polyurethane memory foam compositions with a renewable content of the polyurethane foam. It is also desirable to maintain or improve the performance properties of the polyurethane composition. To achieve a high renewable content of the polyurethane foam, there is a need for biobased polyols, biobased additives, biobased fillers, biobased colorants and biobased diisocyanates. An important need resides in polyurethane memory foam compositions, where the biobased content is, for example, from about 40% to about 100% by weight of the polyurethane composition. Another need resides in providing a polyurethane memory foam as either an open or closed cell structure.

There is still another need to provide a polyurethane memory foam that does not exhibit discoloration over time.

Accordingly, it is at least an object to provide novel biobased polyurethane elastomer memory foam compositions.

SUMMARY

This disclosure is generally directed to biobased polyurethane memory foam compositions which can be selected for articles, such as mattress, upholstery, cushions, footwear, mats, pillows, medical devices, automotive seats and upholstery components. Specifically, the polyurethane memory foam composition can be generated from the reaction of an organic diisocyanate, a chain extender, a crosslinker, a plasticizer, a surfactant, a foaming agent, optionally a colorant, optionally an additive, and a polyester resin of formula 1, and to methods of their preparations.

Disclosed herein are polyurethane memory foam compositions generated, for example, from the reaction of an organic diisocyanate, a chain extender, a plasticizer, a surfactant, a foaming agent, optionally a colorant, optionally an additive and a biomass derived polyester polyol of formula 1 (FIG. 1), and wherein said polyurethane memory foam composition has a an IFD at 25% compression of from about IFD 10 to about IFD 15, at a density of from about 25 to 125 kg/cm$^3$, an hysteresis loss of 40 to 60%, a recovery time of from about 3 to about 8 seconds, and a 50% compression set of less than 5%.

Moreover, disclosed is a process for the preparation of a polyurethane elastomer composition comprising mixing, and then reacting an organic diisocyanate, a chain extender, a crosslinker, a plasticizer, a surfactant, a foaming agent, optionally a colorant, optionally an additive, a catalyst and a polyester (polyol) resin of structure 1, derived from an organic diacid and an organic diol, and wherein the said polyurethane memory foam has a an IFD at 25% compression of from about IFD 10 to about IFD 15, at a density of from about 25 to 125 kg/cm$^3$, an hysteresis loss of 40 to 60%, a recovery time of from about 3 to about 8 seconds, and a 50% compression set of less than 5%.

Further, in embodiments there is disclosed a polyurethane elastomer memory foam composition and processes thereof, and more specifically, a polyurethane memory foam composition that can be selected for mattress, pillows, footwear, automotive seats, upholstery components, and medical devices.

More specifically, there is disclosed a polyurethane elastomer composition derived from an organic diisocyanate, a biobased chain extender, a biobased plasticizer, a surfactant, a foaming agent, optionally a colorant, optionally an additive, and a biobased derived polyester polyol of formula 1, shown in FIG. 1, and wherein the polyurethane memory foam comprises a bio-content of, for example, from about 50 to about 90 percent, from about 70 percent to about 85 percent, and from about 75 percent to about 80 percent.

Accordingly, in one aspect there is provided a polyurethane elastomer memory foam composition comprising an organic diisocyanate, a chain extender, a crosslinker, a plasticizer, a surfactant, a foaming agent, and a polyester resin, the polyester resin being a random copolymer having randomly distributed subunits of formula 1, shown in FIG. 1, where: R is ethylene, octylene, or decylene, a is from about 1 to about 99 mole % of the polyester resin, b is from about 1 to about 99 mole % of the polyester resin, c is from 0 to about 10 mole % of the polyester resin, and a+b+c=100 mole % of the polyester resin.

In the polyester resin of formula 1, a may be from about 40 to about 50 mole % of the polyester resin, b may be from about 40 to about 50 mole % of the polyester resin, and c may be from 0 to about 10 mole % of the polyester resin.

The elastomer may have an indentation force deflection (IFD) rating at 25% compression of from about IFD 10 to about IFD 15, a density of from about 25 to 125 kg/cm$^3$, an n hysteresis loss of from 40 to 60%, a recovery time of from about 3 to about 8 seconds, and a 50% compression set of less than 5%.

The elastomer may have a hardness value of from about 15 to about 60 Asker C, a tensile strength of from about 1 to about 10 MPa, a resilience of from about 25 to about 60%, an elongation at break of from about 150 to about 700%, and a tear strength of from about 2 to about 4 Newtons/millimeters$^2$.

The bio-content of the polyurethane elastomer foam may be from about 70 to about 85%.

The polyester resin may be generated from the reaction of an organic diacid and an organic diol, wherein said organic diacid may be selected from the group consisting of succinic acid, sebacic acid, and 1,12-dodecanedioic acid, and said organic diol may be selected from the group consisting of 1,2-propylene glycol, 1,3-propanediol, and isosorbide.

The polyurethane elastomer memory foam composition may further comprise an additional polyester resin generated from the reaction of an additional organic diacid and an organic diol, wherein said additional organic diacid is selected from the group consisting of succinic acid, sebacic acid, 1,12-dodecanedioic acid, a dimer diacid, and polymerized fatty acids, and said organic diol is selected from the group consisting of 1,2-propylene glycol, 1,3-propanediol, and isosorbide.

The organic diisocyanate may be selected from the group consisting of diphenylmethane 4,4'-diisocyanate, isophorone diisocyanate, dicyclohexylmethane 4,4-diisocyanate, hexamethylene 1,6-diisocyanate, naphthalene 1,5-diisocyanate, and mixtures thereof.

The plasticizer may be selected from the group consisting of tributyl-citrate, an ester, triethyl-citrate, trimethyl-citrate, an adipate, alkyl aryl phthalates, and alkyl benzyls.

The surfactant may be selected from the group consisting of a polyether-silicone oil, a silicone surfactant of sodium dodecylbenzene sulfonate, sodium dodecylnaphthalene sulfate, dialkyl benzenealkyl, adipic acid, polyvinyl alcohol, polyacrylic acid, methalose, methyl cellulose, and ethyl cellulose.

The chain extender may be selected from the group consisting of polyhydric alcohols, alkylene diols and alkylene glycols, and wherein the polyurethane elastomer memory foam composition may further comprise a catalyst.

The crosslinker may be selected from the group consisting of diethanolamine, glycerol, trimethylol propane, pentaerythritol, 1,2,4-butanetriol, thioglycolic acid, 2,6-dihydroxybenzoic acid, melamine, and mixtures thereof.

The polyurethane elastomer memory foam composition may further comprise a colorant. The colorant may be a dye present in an amount of from about 0.5 to about 5% by weight of the polyurethane elastomer memory foam composition.

The polyurethane elastomer memory foam composition may further comprise an additive selected from the group consisting of chitin, chitosan, hazelnut shells, walnut shells, peanut shells, Brazilian nutshells, pecan shells, cashew nutshells, almond shells, chestnut shells, macadamia nutshells, nutmeg, pistachio nutshells, pine nutshells, cellulose, cornplast, lignin, and mixtures thereof. The additive may be present in an amount of from about 0.1 to about 5% by weight of the polyurethane elastomer memory foam composition.

The polyester resin may be selected from the group consisting of terpoly (1,2-propylene-succinate)-terpoly (1,3-propylene-succinate)-terpoly (1,3-isosorbidyl-succinate), terpoly (1,2-propylene-sebacate)-terpoly (1,3-propylene-sebacate)-terpoly (1,3-isosorbidyl-sebacate), terpoly (1,2-propylene-sebacate)-terpoly (1,3-propylene-sebacate)-terpoly (1,3-isosorbidyl-sebacate), terpoly (1,2-propylene-decanoate)-terpoly (1,3-propylene-decanoate)-terpoly (1,3-isosorbidyl-decanoate), copoly 1,2-propylene-succinate)-copoly (1,3-propylene-succinate), copoly 1,2-propylene-sebacate)-copoly (1,3-propylene-sebacate), copoly 1,2-propylene-decanoate)-copoly (1,3-propylene-decanoate), and mixtures thereof.

BRIEF DESCRIPTION OF THE DRAWINGS

Embodiments will now be described more fully with reference to the accompanying drawing in which:

FIG. 1 is a structural view of a polyester (polyol) resin of formula 1.

DETAILED DESCRIPTION OF THE INVENTION

FIG. 1 shows a polyester resin, where the polyester resin is a random copolymer having randomly distributed subunits of formula 1, where R is ethylene, octylene, or decylene, a is from about 1 to about 99 mole % of the polyester resin, b is from about 1 to about 99 mole % of the polyester resin, c is from 0 to about 10 mole % of the polyester resin, and a+b+c=100 mole % of the polyester resin.

In a preferred embodiment, the polyester resin is derived from a mixture of a biobased diacid and a mixture of biobased diols in the presence of a polycondensation catalyst. The biobased diol mixture comprises 1,3-propanediol, 1,2-propylene glycol, and optional isosorbide. The biobased organic diacid comprises one or more of succinic acid, sebacic acid, and dodecanedioic acid. The resulting biobased polyester resin, obtained from the biobased diacid and the biobased diol mixture, comprises randomly distributed subunits (sometimes referred to in the art as "segments") whereby, with reference to formula 1 shown in FIG. 1, subunit a represents the condensation product of the organic diacid with 1,3-propanediol, subunit b represents the condensation product of the organic diacid with 1,2-propylene glycol, and subunit c represents the condensation product of the organic diacid with isosorbide. As will be understood, the polyester resin is also described herein as a polyester polyol, in view of the fact that the polyester end groups are hydroxyl moieties.

The polyester resin of this invention is believed to aid in the formation of a polyurethane foam having an open cell structure, and more so when isosorbide is present due to the incorporation of isosorbide in the polyol, which results in a terpolymer polyol with some end groups that are isosorbide hydroxyl end groups. It is known that isosorbide, when utilized as a chain extender, results in better ability to achieve an open cell structure due to thermally reversible urethane bond formation when reacted with a diisocyanate to form the polyurethane foam, as disclosed by Shin et al., "Effects of isosorbide Incorporation into Flexible Polyurethane Foams: Reversible Urethane Linkages and Antioxidant Activity", Molecules 24, p. 1347 (2019). Furthermore, the antioxidative property of isosorbide is known to prevent discoloration of polyurethane foam. Formation of polyurethane foam can, however, be achieved using the polyester resin of this invention derived from a mixture of biobased diols comprising only 1,3-propanediol and 1,2-propylene glycol, without optional isosorbide. We have found that the preferred composition of the polyol resides in the incorporation of succinic acid, and/or sebacic acid and/or dodecanedioic acid, 1,3-propanediol, 1,2-propylene glycol, and optional isosorbide, which enables memory foam properties with a desirable IFD at 25% compression of from about IFD 10 to about IFD 15, a density of from about 25 to 125 kg/cm$^3$, an hysteresis loss of 40 to 60%, a recovery time of from about 3 to about 8 seconds, and a 50% compression set of less than 5%.

It is a particular feature of the present invention to utilize the polyester polyol shown in FIG. 1, and comprised of a terpolymer polyol which is represented by 3 randomly distributed segments of a, b and c, where segment a is from about 1 to about 99 mole % of the polyester resin, subunit b is from about 1 to about 99 mole % the polyester resin, and subunit c is from 0 to about 10 mole % of the polyester resin, where the sum of a, b and c is 100 mole % of the polyester resin. Preferably, a is from about 20 to about 80 mole % of the polyester resin, subunit b is from about 20 to about 80 mole % the polyester resin, and subunit c is from 0 to about 10 mole % of the polyester resin, where the sum of a, b and c is 100 mole % of the polyester resin. More preferably, a is from about 30 to about 70 mole % of the polyester resin, subunit b is from about 30 to about 70 mole % the polyester resin, and subunit c is from 0 to about 10 mole % of the polyester resin, where the sum of a, b and c is 100 mole % of the polyester resin. Most preferably, a is from about 40 to about 50 mole % of the polyester resin, subunit b is from about 40 to about 50 mole % the polyester resin, and subunit c is from 0 to about 10 mole % of the polyester resin, where the sum of a, b and c is 100 mole % of the polyester resin.

A polyurethane foam composition can be comprised of from about 40 to about 55% by weight of the polyester resin, from about 1 to about 3% by weight of a chain extender, from about 1 to about 7% by weight of a crosslinker, from about 8 to about 15% by weight of a plasticizer, from about 0.2 to about 0.5% by weight of a surfactant, from about 0.1 to about 0.5% by weight of a catalyst, from about 0.1 to about 3% by weight of foaming agent, optionally from about 0.5 to about 5% by weight of colorant of, for example, a dye, a pigment, or mixtures thereof, optionally from about 0.5 to about 5% by weight of an additive, and from about 10 to about 25% by weight of an organic diisocyanate, and where all components present sum to 100% by weight of the polyurethane foam composition.

The polyurethane foam composition can be prepared from a mixture comprising the polyester resin of formula 1, a plasticizer, a surfactant, a chain extender, a crosslinker, a catalyst, an optional foaming agent such as water, optionally a colorant, and optionally an additive, and contacting this mixture with a diisocyanate. Polyurethane foams are generated by the reaction between, for example, the polyester polyol, the diisocyanate, the chain extender, and the crosslinker as reactive ingredients, and the foaming agent, the plasticizer, the surfactant, the optional colorant and the optional additives as non-reactant components that render the elastomer into a foam.

For example, the process for preparation of the polyurethane elastomer memory foam may comprise contacting a homogenized mixture of from about 40 to about 60 parts of the polyester resin of formula 1, from about 8% by weight to about 20% by weight of a plasticizer, from about 0.5 to about 0.5% by weight of surfactant, from about 0.5 to about 2 parts of chain extender, from about 0.1 to about 0.6 parts of a catalyst, from about 0.1 to about 5 parts of a foaming agent of water, from about 0.1 to about 5 parts of crosslinker, optionally from about 0.3 to about 5 parts of a colorant, optionally from about 0.3 to about 5 parts of an additive and with from about 9 to about 15 parts of diisocyanate.

In one embodiment, the polyurethane elastomer memory foam can be prepared using a multistage process comprising soft-segment pre-extensions, where a portion of the linear polyester polyol is reacted with an organic diisocyanate in a NCO:OH molar ratio of from 1.1:1 to 3.5:1, and preferably from about 1.3:1 to about 2.5:1, to provide an isocyanate-terminated prepolymer ("NCO prepolymer"). The NCO prepolymer obtained is then blended and reacted with the remaining polyester (polyol) portion and with the chain extenders, crosslinker and with the presence of non-reactive plasticizer, surfactant, foaming agent, optional colorant and optional additive to result in the polyurethane elastomer.

Embodiments

Polyester (polyol) Resins

The polyester resins of formula 1 can be prepared by a polycondensation process by reacting organic diols and at least one organic diacid in the presence of polycondensation catalysts. Generally, a stoichiometric equimolar ratio of organic diol and organic diacid is utilized, however, an excess of organic diol can be selected such that the resulting polymer displays a hydroxyl number of from about 30 to about 40, an acid number of less than about 5 milligrams/gram of KOH, and more specifically, less than about 3 milligrams/gram of KOH, and a molecular weight average of from about 1,500 to about 5,000 Daltons as determined by GPC. In some instances, where the boiling point of the organic diol is from, for example, about 180° C. to about 230° C., an excess amount of diol, such as an alkylene glycol of, for example, 1,2-propylene glycol or 1,3-propanediol of from about 0.2 to 1 mole equivalent, can be utilized and removed during the polycondensation process by distillation. The amount of catalyst utilized varies, and can be selected in amounts as disclosed herein, and more specifically, for example, from about 0.01 to about 1% by weight, or from about 0.01 to about 0.05% by weight based on the polyester resin.

Examples of organic diacids or diesters, which can be those obtained through a fermentation process, or natural sources such as those chemically derived from natural (biobased) sources, selected for the preparation of the polyester resins include succinic acid, sebacic acid, and dodecanedioic acid. The organic diacid is selected in an amount of, for example, from about, 35 to about 60% by weight, and preferably from about 45 to about 50% by weight of the polyester resin.

The organic diol reactants selected, which can also be obtained from biomasses generated through fermentation process, natural sources, and chemically derived from natural sources, include 1,2-propanediol (1,2-propylene glycol), 1,3-propanediol, and optionally isosorbide.

In some embodiments, in addition to the polyester resins of formula 1, an additional polyester resin may be prepared by a polycondensation process by reacting organic diols and at least one organic diacid in the presence of polycondensation catalysts, as described above. Examples of organic diacids or diesters selected for the additional polyester resin include succinic acid, sebacic acid, and dodecanedioic acid, C-18 dimer acids, or dimerized fatty acids of dicarboxylic acids prepared by dimerizing unsaturated fatty acids obtained from tall oil, usually on clay catalysts; hydrogenated/saturated dimer acids, and other known suitable organic diacids, and the like. Examples of organic diol reactants selected for the additional polyester resin include 1,2-propanediol (1,2-propylene glycol), 1,3-propanediol, and optionally isosorbide.

Polycondensation catalysts utilized for the preparation of the polyester resin include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), or mixtures thereof, and other known suitable catalysts; and which catalysts are selected in amounts of, for example, from about 0.01% by weight to about 5% by weight, from about 0.1 to about 0.8% by weight, and from about 0.2 to about 0.6% by weight, based on the starting diacid or diester used to generate the polyester resins, and other suitable known catalysts.

The polyester resins of this invention, as illustrated in FIG. 1, are derived from one or more biobased organic diols such as 1,2-propylene glycol, 1,3-propanediol and isosorbide, and biobased organic diacids such as succinic acid, sebacic acid, dodecanedioic acid, and include terpoly (1,2-propylene-succinate)-terpoly (1,3-propylene-succinate)-terpoly (1,3-isosorbidyl-succinate), terpoly (1,2-propylene-sebacate)-terpoly (1,3-propylene-sebacate)-terpoly (1,3-isosorbidyl-sebacate), terpoly (1,2-propylene-sebacate)-terpoly (1,3-propylene-sebacate)-terpoly (1,3-isosorbidyl-sebacate), terpoly (1,2-propylene-decanoate)-terpoly (1,3-propylene-decanoate)-terpoly (1,3-isosorbidyl-decanoate), copoly 1,2-propylene-succinate)-copoly (1,3-propylene-succinate), copoly 1,2-propylene-sebacate)-copoly (1,3-propylene-sebacate), copoly 1,2-propylene-decanoate)-copoly (1,3-propylene-decanoate), mixtures thereof, other suitable known polyesters and the like.

The polyester resins may optionally have a melting point of less than 50° C., such as from about 0° C. to about 49° C., or less than 70° C., and from about 40° C. to about 60° C. In general, the preferred polyester resin of this disclosure does not possess a melting point and can have a glass transition temperature of, for example, from about −25° C. to about 10° C.

The polyester resin, and mixtures thereof can be present in the polyurethane elastomer in amounts of, for example, from about 25 to about 65% by weight, from about 30 to about 55% by weight, and from about 40 to about 60% by weight, based on the polyurethane elastomer weight.

In a preferred embodiment, the polyester resin of FIG. 1 can be prepared by reacting a mixture of biobased diol such as 1,2-propylene glycol, in an amount of from about 20 to about 25 mole % of the polyester resin, 1,3-propanediol in an amount from about 20 to about 25 mole % of the polyester resin, and isosorbide in an amount from 0 to about 10 mole % of the polyester resin, with a biobased diacid such as one or more of succinic acid, sebacic acid, dodecanedioic acid, and mixtures thereof, in an amount from about 45 to 50 mole % of the polyester resin, in the presence of a polycondensation catalyst in an amount of from about 0.01 to about 0.1 mole % of the polyester resin, and provided that the sum of all reactants is 100 mole % of the polyester resin. Note that an excess of 1,2-propylene glycol and/or 1,3-propanediol is initially added, and then removed by distillation during production of the polyester resin, such that the polyester end groups are primarily comprised of hydroxyl end groups such that the resulting polymer displays a hydroxyl number of from about 30 to about 40, an acid number of less than about 5 milligrams/gram of KOH, and more specifically, less than about 3 milligrams/gram of KOH. Furthermore, in order to obtain a polyester resin with predominant hydroxy end groups, the mole ratio of diol to diacid is from about 1.05 to about 1.3, and the excess amount of diol is removed by distillation.

In another embodiment of the present invention, the polyester resin of FIG. 1 can be prepared by reacting a mixture of biobased diol such as 1,2-propylene glycol, in an amount of from about 20 to about 25 mole % of the polyester resin, 1,3-propanediol in an amount from about 20 to about 25 mole % of the resin and polymerized to an oligomeric form, and thereafter isosorbide, in an amount from about 0.1 to about 10 mole % the polyester resin, can be added such that end groups of the polyol are predominantly the hydroxyl end groups of the isosorbide moieties.

Plasticizers

The plasticizer is selected, for example, from tributyl-citrate, CITROFOL® available from Jungbunzlauer, Hallstar IM 8830, an ester available from Hallstar, triethyl-citrate; trimethyl-citrate, adipates such as EDENOL® 650R available from Emery Olechemicals, tributyl citrate, alkyl aryl phthalates, alkyl benzyl phthalates, including butyl benzyl phthalate, alkyl benzyl phthalate, and wherein the alkyl group has a carbon chain of from seven to nine carbon atoms, TEXANOL™, benzyl phthalate, (2,2,4-trimethyl-1, 3-pentanediol-monobutyrate benzyl phthalate), alkylphenyl phthalate, symmetrical and unsymmetrical dialkyl phthalates, including diisononyl phthalate, diisodecyl phthalate, dioctyl phthalate, di-n-butyl phthalate, dioctyl phthalate, dihexyl phthalate, diheptyl phthalate, butyloctyl phthalate, linear dialkyl phthalate, wherein the alkyl groups are independently carbon chains having from about seven to about eleven carbon atoms, and butyl cyclohexyl phthalate; phosphate plasticizers, such as tris-(2-chloro-1-methylethyl) phosphate, tris-(alpha-chloroethyl)phosphate (TCEP), tris-(2,3-dichloro-1-propyl)phosphate, YOKE-V6 (tetrakis-(2-chloroethyl)dichloroisopentyldiphosphate), and the like; phosphate ester plasticizers, such as, for example, 2-ethyl-hexyl diphenyl phosphate, isodecyl diphenyl phosphate, mixed dodecyl and tetradecyl diphenyl phosphate, trioctyl phosphate, tributyl phosphate, butylphenyl diphenyl phosphate, and isopropylated triphenyl phosphate; and benzoate plasticizers, such as, for example, TEXANOL™ benzoate (which is 2,2,4-trimethyl-1,3-pentanediol-monobutyrate benzoate), glycol benzoate, propylene glycol dibenzoate, dipropylene glycol is dibenzoate, and tripropylene glycol dibenzoates, in amounts of, for example, from about 1% by weight to about 30% by weight, and from about 1% by weight to about 15% by weight based on the amount of the polyurethane elastomer, and other known suitable plasticizers. The preferred plasticizers of this invention are the biobased plasticizers such as triethyl citrate, tributyl citrate and acetyl triethyl citrate, and the biobased plasticizers disclosed in U.S. Pat. No. 11,072,694 to Evoco Limited.

Crosslinkers

The crosslinker is, for example, selected from diethanolamine, glycerol, trimethylol propane, pentaerythritol, 1,2,4-butanetriol, thioglycolic acid, 2,6-dihydroxybenzoic acid, melamine, diglycolamine, 1,2,6-hexanetriol, glycerol, 1,1,1-trimethylolethane, 1,1,1-trimethylolpropane (TMP), pentaerythritol, triisopropanol amine, triethanol amine, tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, and glycerol, and especially polyols, such as trimethylolpropane, pentaerythritol, and glycerol, and biobased materials thereof, present in amounts of, for example, from about 0.1 to about 10% by weight, and from about 0.1 to about 5% by weight based on the amount of polyurethane elastomer. Other suitable known crosslinkers may also be used.

Chain Extenders

Examples of chain extenders that can be used include alcohols, such as polyhydric alcohols, carboxylic acid derivatives having two functional groups can be selected for the elastomers and processes disclosed herein. More specifically, the chain extender may comprise, for example, two hydroxyl moieties such as 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols like ethylene glycol, propylene glycol, monoethylene glycol, diethylene glycol, monopropylene glycol, dipropylene glycol, isosorbide and mixtures thereof, other known suitable chain extenders, and the like, present in amounts of, for example, from about 0.1 to about 10% by weight, and preferably from about 0.1 to about 5% by weight, based on the polyurethane elastomer. Other known suitable chain extenders may also be used. The preferred chain extenders of this invention are the biobased chain extenders such as 1,3-propanediol, 1,2-propylene glycol, 1,4-butanediol, and isosorbide.

Surfactants

Surfactants are utilized to improve compatibility emulsification ability between additives and polyols, to stabilize the foam process, to increase flowability, to provide uniformity in the cell structure (open or closed), to reduce the large voids under foam surface, and to provide very fine cell structure and homogeneous density distribution. The surfactants that can be selected are, for example, polyether-silicone oil mix (TEGOSTAB® B4113) available from Evonik, 8383, silicone surfactant DABCO DC® 193, and TEGOSTAB® B8383 available from Evonik, ORTEGOL 501 PF available from Evonik, sodium dodecylbenzene sulfonate, sodium dodecylnaphthalene sulfate, dialkylbenzenealkyl, sulfates and sulfonates, adipic acid, available from Aldrich, NEOGEN R™, NEOGEN SC™, available from Daiichi Kogyo Seiyaku, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, ANTAROX890™, and ANTAROX897™, and other suitable known surfactants in amounts of, for example, from about 0.1 to about 10% by weight, and preferably from about 0.1 to about 3% by weight, based on the polyurethane elastomer amount.

Catalysts

Polycondensation catalysts utilized for the preparation of the polyester resins, include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), other suitable known catalysts or mixtures thereof; and which catalysts are selected in amounts of, for example, from about 0.01% by weight to about 5% by weight, from about 0.1 to about 0.8% by weight, and from about 0.2 to about 0.6% by weight, and other suitable, with the percentage based on the starting diacid or diester used to generate the polyester.

Examples of catalysts selected for the preparation of the polyurethane elastomers, and which catalysts can react with the organic diisocyanates include, for example, known tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, DAPCO 33 LV (33% triethylenediamine dissolved in 67% dipropylene glycol), BICAT 8109 (bismuth neodecanoate), Jeffcat-Zf-54 (bis-(2-dimethylaminoethyl)ether in dipropylene glycol), KOSMOS® 75 MEG, and the like; organometallic compounds, such as titanic esters, iron compounds, tin compounds, such as tin diacetate, tin dioctoate, tin dilaurate, the dialkyl tin salts of aliphatic carboxylic acids like dibutyltin diacetate and dibutyltin dilaurate, other suitable catalysts and the like. The total amount of catalysts selected is generally from about 0.1 to about 5% by weight, and preferably from about 0.1 to about 1% by weight, based on the polyurethane elastomer.

Colorants

The optional colorant examples that can be selected for the preparation of the polyurethane elastomer compositions may be present, for example, in amounts of from about 0.1 to about 5% by weight, and preferably from about 0.1 to about 3% by weight based on the amount of the polyurethane elastomer, and include pigments, dyes, mixtures thereof, and the like. Examples of colorants include dyes and pigments include inorganic pigments, such as carbon black, whiteners, such as titanium oxide which has weather resistance, and organic pigments and dyes, such as phthalocyanine blue, azo dyes, Indigo, Congo Red, Methyl Orange, Malachile Green, purple dyes, brown dyes, black dyes, Pigment Blue 15:3 or C.I. Pigment Blue 15:4, phthalocyanine green, quinacridone red, indanthrene orange, and isoindolinone yellow, C.I. Pigment Red 254 and C.I. Pigment Red 122, C.I. Pigment Yellow 151 and C.I. Pigment Yellow 74, Fates Dye and Keen Dye available from BAO Shen Polyurethane Tech.LTD-China, purple dyes, brown dyes, and other suitable known colorants, such as known dyes and pigments illustrated in the Colour Index (C.I.), and magenta, yellow, and cyan colorants.

Foaming Agents

Water is selected as the foaming (or "blowing") agent present in the reaction mixture, and in turn in the flexible polyurethane foams thereof. As will be understood, the foaming agent increases the firmness of the resulting foam. Other suitable known foaming (or "blowing") agents may also be used. A soft, flexible, plasticized water-blown polyurethane foam composition can be produced from the reaction of a natural polyol and methylene diphenyl diisocyanate, (MDI) or an equivalent isocyanate, and by optionally adding a plasticizer.

Specific examples of other foaming agents include compressed gases, such as $CO_2$, $N_2$, air or low boiling liquids like cyclopentane, pentane, isobutane and hydrofluorocarbons, added in amounts of from about 0.5% by weight to about 3% by weight of the polyurethane elastomer. Also, for example, $CO_2$ may be generated in-situ by the decomposition of $NaHCO_3$ or the reaction of water with isocyanate and other known suitable foaming agents.

Additives

Examples of additives are as illustrated herein, and include bio-additives such as chitin and chitosan (obtained from Tidal Vision), eggshells (obtained from Lady Gouldian Finch), hazelnut shells (obtained from Grimo Nut Nursery), walnut shells, peanut shells, Brazilian nutshells, pecan shells, cashew nutshells, almond shells, chestnut shells, macadamia nutshells, Nutmeg, Nutmeg shells (Mace), pistachio nutshells, pine nutshells, cellulose, cornplast, starch mixtures thereof, and a bio-additive selected from the group consisting of chitin, chitosan, eggshell, hazelnut shell, walnut shell, peanut shell, Brazilian nutshell, pecan shell, cashew nutshell, almond shell, chestnut shell, macadamia nutshell, pistachio nutshell, pine nutshell, cellulose, lignin's include, alkali lignin's, Kraft lignin's, Klason lignin's, hydrolytic lignin's, enzymic mild acidolysis lignin's, organosolv lignins, steam explosion lignin's, milled wood lignin's, lignin sulphones, lignin sulphates (lignosulphonates) including the salts thereof of Ca, Na, Mg, K and Black Liquor, other suitable known lignin's, and mixtures thereof, present in amounts of, for example, from about 0.1% by weight to about 10% by weight, from about 0.5% by weight to about 10% by weight, from about 0.3% by weight to about 5% by weight, from about 0.5% by weight to about 5% by weight, from about 3% by weight to about 8% by weight, and other suitable weight % ages, based on the polyurethane elastomer to thereby enhance the bio-content of the elastomers and the foams and render them environmentally friendly while simultaneously preserving or improving the mechanical properties of the foams. The preferred additives are biobased as disclosed in U.S. Pat. No. 10,934,385 to Evoco Limited.

Diisocyanates

Examples of diisocyanates selected for the compositions and processes illustrated herein include aliphatic diisocyanates, such as hexamethylene diisocyanate, cycloaliphatic diisocyanates, such as isophorone diisocyanate, cyclohexane 1,4-diisocyanate, 1-methylcyclohexane 2,4-diisocyanate, and 1-methylcyclohexane 2,6-diisocyanate, and the corresponding isomer mixtures, dicyclohexylmethane 4,4'-diisocyanate, dicyclohexylmethane 2,4'-diisocyanate, dicyclohexylmethane 2,2'-diisocyanate, and the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. Especially selected diisocyanates are hexamethylene 1,6-diisocyanate, cyclohexane 1,4-diisocyanate, isophorone diisocyanate, dicyclohexylmethane diisocyanate, diphenylmethane diisocyanates with more than 96% by weight content of diphenylmethane 4,4'-diisocyanate, diphenylmethane 4,4'-diisocyanate, and naphthylene 1,5-diisocyanate, suitable known diisocyanates, and mixtures thereof, and the like, and other known suitable organic diisocyanates.

In embodiments, there can be selected mixtures of a diisocyanate and a polyisocyanate in an amount of up to about 15% by weight, based on the total diisocyanates present, however, up to about 40% by weight of polyisocyanate can be added, and that provides an improved thermoplastically processable product. Examples of polyisocyanates include triisocyanates, biurets and isocyanurate trimer. For example, triphenylmethane 4,4',4"-triisocyanate and polyphenylpolymethylene polyisocyanates as well as hexamethylene diisocyanate (HDI) biuret trimer, isocyanurate trimer, and isophorone (IPDI) isocyanurate trimer.

The characteristics and properties of the polyurethane products can be measured as illustrated herein, and by known processes and devices. More specifically, the tensile tester may be the ADMET eXpert 7601 Tensile Tester, to measure tensile strength, elongation, tear strength and compression set, by preparing a sample of the polyurethane composition foam material compositions—in dog bone shapes with a die cutter with a standard thickness of about 10 millimeters and a length of about 140 millimeters based on ASTM D412, ASTM D3574-17, SATRA TM-2 standards. The sample removed is placed between clamps and where the tensile tester applies the appropriate force at a particular speed (generated by the software) on the test material sample to provide the characteristics, properties and values of the polyurethane products.

Density is measured using the equation Density=Mass/Volume, where mass represents the mass of the material in a mold measured on an analytical balance. Volume of the mold is obtained from the dimensions of the mold. For example, if a mold was producing 10 millimeters, or 1 centimeter polyurethane foam plaques with dimensions length equal to 21 centimeters width equal to 14.8 centimeters, and the thickness equal to 10 millimeters, then the volume is calculated to be 21 times 14.8 times 1 equals 310.80 centimeters$^3$.

The hardness is measured on the Asker C scale and can also be measured by a durometer.

The bio-content of the disclosed polyurethane elastomer foams can be determined by various methods. In one method, the bio-content can be measured as follows and where, for example, the polyester polyol, plasticizer, and chain extender can also impart bio-content characteristics to the polyurethane elastomer foams:

A) Add the total weight of the components/ingredients=X grams

B) Add the weight of the components ingredients that are biobased, the polyester resin plus the chain extender plus the plasticizer=Y grams C) Total bio-content=(Y/X)×100=the bio-content in %.

For example, if 100 grams of the polyester resin are selected and 5% by weight of the bio-additive/filler was added, then based on the polyester resin, the amount of the bio additive-based filler is 100×0.05=5 grams.

D) Total weight of ingredients including the bio-filler=Z grams

E) Weight of the biobased ingredients, which also includes the bio additive-filler=W grams F) New bio-content=(W/Z)×100=NT N represents the new bio-content with the biocide additive, or where the bio-content can be derived from the polyol polyester, the plasticizer, and the chain extender.

Specific embodiments of the present disclosure as illustrated in the following Examples are for illustrative purposes and are not limited to the materials, conditions, or process parameters set forth in these embodiments.

Example 1

Preparation of polyester resin from succinic acid, 1,3-propanediol and 1,2-propylene glycol ("1,2-propanediol") to obtain copoly-(1,3-propylene-succinate)-copoly-(1,2-propylene-succinate) of formula 1, where R is ethylene ($CH_2CH_2$), subunit a is about 47.6 mole % of the polyester resin, subunit b is about 53.4 mole % of the polyester resin, and subunit c is 0 mole % of the polyester resin, and where the mole ratio of diacid to diol monomers is 1.273.

To a 5 L three-necked round bottom flask equipped with a mechanical stirrer and distillation apparatus were added 2.7 kg (22.86 moles) of succinic acid, 1.02 kg (13.4 moles) of 1,3-propanediol, 1.195 kg (15.7 moles) of 1,2-propylene glycol and 5 g of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 g) were then removed every 30 minutes until a viscosity of about 1800 centipoise (as measured by a Brookfield CAP2000 Viscometer at 70° C. and a spindle rate of 100 rpm) and an acid value of was 0.98 milligram/gram of KOH was obtained. The polyester resin was then discharged into a metal pan.

Example 2

Preparation of polyester resin from succinic acid, 1,3-propanediol and 1,2-propylene glycol to obtain copoly-(1,3-propylene-succinate)-copoly-(1,2-propylene-succinate) of formula 1, where R is ethylene ($CH_2CH_2$), subunit a is about 45.5 mole % of the polyester resin, subunit b is about 54.5 mole % of the polyester resin, and subunit c is 0 mole % of the polyester resin, and where the mole ratio of diacid to diol monomers is 1.224.

To a 5 L three-necked round bottom flask equipped with a mechanical stirrer and distillation apparatus were added 2.7 kg (22.86 moles) of succinic acid, 0.96 kg (12.75 moles) of 1,3-propanediol, 1.16 kg (15.25 moles) of 1,2-propylene glycol and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then removed every 30 minutes until a viscosity of about 1150 centipoise (as measured by a Brookfield CAP2000 Viscometer at 70° C. and a spindle rate of 100 rpm) and an acid value of 1.52 milligram/gram of KOH was obtained. The polyester resin was then discharged into a metal pan.

Example 3

Preparation of polyester resin from sebacic acid, 1,3-propanediol and 1,2-propylene glycol to obtain copoly (co-poly (1,3-propylene-sebacate)-copoly (1,2-propylene-sebacate) of formula 1, where R is octylene ($(CH_2)_8$), subunit a is about 50 mole % of the polyester resin, subunit b is about 50 mole % of the polyester resin, and subunit c is 0 mole % of the polyester resin, and where the mole ratio of diacid to diol monomers is 1.274.

To a 5 L three-necked round bottom flask equipped with a mechanical stirrer and distillation apparatus were added 3.025 kg (15 moles) of sebacic acid, 0.725 kg (9.53 moles) of 1,3-propanediol, 0.725 kg (9.53 moles) of 1,2-propylene glycol and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then removed every 30 minutes until a viscosity of about 1850 centipoise (as measured by a Brookfield CAP2000 Viscometer at 70° C. and a spindle rate of 100 rpm) and an acid value of about 1.0 milligram/gram of KOH was obtained. The polyester resin was then discharged into a metal pan.

Example 4

Preparation of polyester resin from succinic acid, 1,3-propanediol, 1,2-propylene glycol and isosorbide to obtain terpoly (1,2-propylene-succinate)-terpoly (1,3-propylene-succinate)-terpoly (1,3-isosorbidyl-succinate) of formula 1, where R is ethylene ($CH_2CH_2$), subunit a is about 47.5 mole % of the polyester resin, subunit b is about 47.5 mole % of the polyester resin, and subunit c is about 5 mole % of the polyester resin, and where the mole ratio of diacid to diol monomers is 1.263.

To a 5 L three-necked round bottom flask equipped with a mechanical stirrer and distillation apparatus were added 2.4 kg (20.32 moles) of succinic acid, 0.9 kg (12.6 moles) of 1,3-propanediol, 0.9 kg (12.6 moles) of 1,2-propylene glycol, 297 grams (2.03 moles) of isosorbide and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then removed every 30 minutes until a viscosity of about 1800 centipoise (as measured by a Brookfield CAP2000 Viscometer at 70° C. and a spindle rate of 100 rpm) and an acid value of about 1.0 milligram/gram of KOH was obtained. The polyester resin was then discharged into a metal pan.

Example 5

Preparation of polyester resin from succinic acid, 1,3-propanediol, 1,2-propylene glycol and isosorbide to obtain terpoly (1,2-propylene-succinate)-terpoly (1,3-propylene-succinate)-terpoly (1,3-isosorbidyl-succinate) of formula 1, where R is ethylene ($CH_2CH_2$), subunit a is about 47.5 mole % of the polyester resin, subunit b is about 47.5 mole % of the polyester resin, and subunit c is about 5 mole % of the polyester resin, and where the mole ratio of diacid to diol monomers is 1.263. It will be noted that 2.5 mole % of the isosorbide was added at the beginning, and the remaining 2.5 mole % of isosorbide was added toward the end such that the polyol resin end groups have predominantly isosorbide hydroxyl end moieties.

To a 5 L three-necked round bottom flask equipped with a mechanical stirrer and distillation apparatus were added 2.4 kg (20.32 moles) of succinic acid, 0.9 kg (12.6 moles) of 1,3-propanediol, 0.9 kg (12.6 moles) of 1,2-propylene glycol, 148.5 grams (1.02 moles) of isosorbide and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. To the mixture was then added 148.5 (1.02 moles) grams of isosorbide. The mixture was then heated to 200° C. during a 30-minute period, during which both water and excess diol were collected in the distillation receiver. Samples (about 2 grams) were then removed every 30 minutes until a viscosity of about 1800 centipoise (as measured by a Brookfield CAP2000 Viscometer at 70° C. and a spindle rate of 100 rpm) and an acid value of about 1.0 milligram/gram of KOH was obtained. The polyester resin was then discharged into a metal pan.

Example 6

Preparation of polyester resin from succinic acid, 1,3-propanediol, 1,2-propylene glycol and isosorbide to obtain terpoly (1,2-propylene-succinate)-terpoly (1,3-propylene-succinate)-terpoly (1,3-isosorbidyl-succinate) of formula 1, where R is ethylene ($CH_2CH_2$), subunit a is about 47.5 mole % of the polyester resin, subunit b is about 47.5 mole % of the polyester resin, and subunit c is about 5.0 mole % of the polyester resin, and where the mole ratio of diacid to diol monomers is 1.272. It will be noted that 2.5 of the 5.0 mole % of the isosorbide was added toward the end such that the polyol resin end groups have predominantly isosorbide hydroxyl end moieties.

To a 5 L three-necked round bottom flask equipped with a mechanical stirrer and distillation apparatus were added 2.4 kg (20.32 moles) of succinic acid, 0.9 kg (12.6 moles) of 1,3-propanediol, 0.9 kg (12.6 moles) of 1,2-propylene glycol, and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. To the mixture was then added 145.5 (1.02 moles) grams of isosorbide. The mixture was then heated to 200° C. during a 30-minute period, during which both water and excess diol were collected in the distillation receiver. Samples (about 2 grams) were then removed every 30 minutes until a viscosity of about 1800 centipoise (as measured by a Brookfield CAP2000 Viscometer at 70° C. and a spindle rate of 100 rpm) and an acid value of about 1.0 milligram/gram of KOH was obtained. The polyester resin was then discharged into a metal pan.

Example 7

Preparation of polyurethane memory foam as a free rise bun, in open air and not in a mold, to test for formation of polyurethane product.

To a 200 mL glass container was added 35 grams of the molten (at 50° C.) semi-crystalline polyester resin obtained in Example 1. To this was then added 3.5 grams of the plasticizer tributyl citrate (available from Jungbunzlauer as CITROFOL®), 0.19 grams of TEGOSTAB® surfactant (available from Evonik), 1.75 grams of the chain extender 1,3-propanediol, 0.35 gram of DABCO LV® catalyst (available from Evonik), 0.31 grams of water, 0.035 grams of diethanolamine crosslinker, available from Evonik as DEOA, and 1.24 grams of FATE® dye (available from BAO Shen PolyurethaneTech.LTD-China). The mixture was then maintained at 50 to 55° C. for 5 minutes, and then homogenized at 1500 rpm for 4 minutes, after which 11.9 milliliters of methylenediphenyl diisocyanate (MDI) (available from Huntsman as Suprasec 2379) was added with a syringe, and the mixture was further homogenized for 5 seconds. The mixture was then poured into a cup, and a foam was formed by reaction of the polyester polyol mixture with MDI isocyanate, generating a free rise bun. The stable bun was formed with a cream time of about 10 to 12 seconds, a tack free time of about 110 to about 120 seconds, and a demold time of 20 minutes, resulting in a density of 0.15 g/cm³ and a hardness of 14 (as determined using a durometer). There was no shrinkage or scorching. After the free rise, the foam was cut into test specimens having regular dimensions of suitable length, width and thickness, and the mass was measured by an analytical scale in grams. The density of the resulting free rise foam was determined from the volume estimated from L×W×T (1 centimeter×1 centimeter×4 centimeters=4 centimeters³) in accordance with the methodology of the ASTM D7487-13 standard.

The density of the foam was measured as 0.11+/−1 g/cm³ the, where density=mass/volume.

As an example, mass=0.44 g, volume=4 cm³, hence the foam density=0.11 g/cm³.

The test specimen was placed on a scale, and the scale was tared. A durometer was then placed on the test specimen. A force was applied to the durometer until the scale read a mass of 2400 grams. This method assured standardization of the force applied to the test material. The hardness was read on the durometer digital scale in Asker C of 14.

Samples of polyurethane memory foam having the composition of this Example were then prepared in a free rise wood block mold having dimensions of 15"×15" x 4". The foam samples were then tested according to the ASTM D3574-03 B1 standard. The test results revealed that most memory foam samples exhibited an IFD of 22.5%. The biobased content of the polyurethane memory foam composition of this Example was 75.1%.

Example 8

Preparation of Polyurethane Memory Foam as a Free Rise Bun, in Open Air and not in a Mold, to Test for Formation of Polyurethane Product, Using Cell Opener to Achieve Low Density To a 200 mL glass container was added 35 grams of the molten (at 50° C.) semi-crystalline polyester resin obtained in Example 4. To this was then added 3.5 grams of the plasticizer tributyl citrate (available from Jungbunzlauer as CITROFOL®), 0.19 grams of TEGOSTAB® surfactant (available from Evonik), 0.035 grams of ORTEGOL 501 PF (available from Evonik), 1.75 grams of the chain extender 1,3-propanediol, 0.35 grams of DABCO LV® catalyst (available from Evonik), 0.31 grams of water, and 1.24 grams of FATE® dye (available from BAO Shen PolyurethaneTech.LTD-China). The mixture was maintained at 50 to 55° C. for 5 minutes, and then homogenized at 1500 rpm for 4 minutes, after which 11.9 mL of methylenediphenyl diisocyanate (MDI) (available from Huntsman as Suprasec 2379) was added with a syringe, and the mixture was further homogenized for 5 seconds. The mixture was then poured into a cup, and a foam was formed by reaction of the polyester polyol mixture with MDI isocyanate, generating a free rise bun. The stable bun was formed with a cream time of about 10 to 12 seconds, a tack free time of about 110 to about 120 seconds, and a demold time of 20 minutes, resulting in a density of 0.07 g/cm³ and a hardness of 10 (as determined using a durometer). There was no shrinkage or scorching. After the free rise, the foam was cut into test specimens having regular dimensions of suitable length, width and thickness, and the mass was measured by an analytical scale in grams. The density of the resulting free rise foam was determined from the volume estimated from L×W×T (1 centimeter×1 centimeter×4 centimeters=4 centimeters³) in accordance with the methodology of the ASTM D7487-13 standard.

The density of the foam was measured as 0.07+/−1 g/cm³ the, where density=mass/volume.

As an example, mass=0.28 g, volume=4 cm³, hence the foam density=0.07 g/cm 3.

The test specimen was placed on a scale, and the scale was tared. A durometer was then placed on the test specimen. A force was applied to the durometer until the scale read a mass of 2400 grams. This method assured standardization of the force applied to the test material. The hardness was read on the durometer digital scale in Asker C of 10.

Samples of polyurethane memory foam having the composition of this Example were then prepared in a free rise wood block mold having dimensions of 15"×15"×4". The foam samples were then tested according to the ASTM D3574-03 B1 standard. The test results revealed that most memory foam samples exhibited an IFD of 24.6%. The biobased content of the polyurethane memory foam composition of this Example was 75.2%.

Example 9

Preparation of Plaques of Polyurethane Memory Foam

80 Grams of the polyester resin obtained in Example 4 was melted in a 400 mL glass container at 70° C. for 2 hours using an oven. To this was added 8 grams of tributyl citrate (available from Jungbunzlauer as CITROFOL®), 0.44 grams of TEGOSTAB® surfactant (available from Evonik), 4 grams of 1,3 propanediol, 0.8 grams of DABCO DC® catalyst (available from Evonik), 0.08 grams of ORTEGOL 501 PF (available from Evonik), 0.80 grams of water, 2.63 grams of FATE® dye (available from BAO Shen Polyurethane Tech.LTD-China), and 0.225 grams of diethanol amine. The resulting mixture was stirred for 4 minutes at 1500 rpm to homogenize, after which 37.18 grams of methylenediphenyl diisocyanate (MDI) (available from Huntsman as SUPRASEC™ 2379) was added with a syringe. Once the syringe was empty, the resulting mixture was stirred for an additional 5 seconds, and the mixture was then poured into plaque mold having a 10 mm thickness. The resulting plaque was cut into appropriate dog-bone shaped specimens, which were tested for mechanical properties. The measured mechanical properties were a density of 0.15 g/cm$^3$, a hardness of 20, a tensile strength of 1.1 MPa, an elongation of 280%, a tear strength of 1.7 N/mm$^2$, a compression set (50%) of 6%, and a resilience of 10%.

Samples of polyurethane memory foam having the composition of this Example were then prepared in a free rise wood block mold having dimensions of 15"×15"×4". The foam samples were then tested according to the ASTM D3574-03 B1 standard. The test results revealed that most memory foam samples exhibited an IFD of 26.5%. The biobased content of the polyurethane memory foam composition of this Example was 75.3%.

Example 10

Preparation of Polyurethane Memory Foam as a Free Rise Bun, in Open Air and not in a Mold, to Test for Formation of Polyurethane Product, Using Isosorbide as a Cell Opener To a 200 mL glass container was added 35 grams of the molten (at 50° C.) semi-crystalline polyester resin obtained in Example 1. To this was then added 3.5 grams of the plasticizer tributyl citrate (available from Jungbunzlauer as CITROFOL®), 0.19 grams of TEGOSTAB® surfactant (available from Evonik), 0.035 grams of isosorbide (available from Roquette® PO 500), 1.75 grams of the chain extender 1,3-propanediol, 0.35 grams of DABCO LV® catalyst (available from Evonik), 0.31 grams of water, and 1.24 grams of FATE® dye (available from BAO Shen PolyurethaneTech.LTD-China). The mixture was then maintained at 50 to 55° C. for 5 minutes, and then homogenized at 1500 rpm for 4 minutes. After homogenization, 11.9 milliliters of methylenediphenyl diisocyanate (MDI) (available from Huntsman as SUPRASEC™ 2379) was added with a syringe, and the mixture was further homogenized for 5 seconds. The mixture was then poured into a cup, and a foam formed by reaction of the polyester polyol mixture with MDI isocyanate, generating a free rise bun. The stable bun was formed with a cream time of about 11 to 13 seconds, a tack free time of about 120 to about 130 seconds, a demold time of 20 minutes, resulting in a density of 0.09 g/cm$^3$ and a hardness of 12 (as determined using a durometer). There was no shrinkage or scorching. After the free rise, the foam was cut into test specimens having regular dimensions of suitable length, width and thickness, and the mass was measured by an analytical scale in grams. The density of the resulting free rise foam was determined from the volume estimated from L×W×T (1 centimeter×1 centimeter×4 centimeters=4 centimeters$^3$) in accordance with the methodology of the ASTM D7487-13 standard.

The density of the foam was measured as 0.09+/−1 g/cm$^3$ the, where density=mass/volume.

As an example, mass=0.36 g, volume=4 cm$^3$, hence the foam density=0.09 g/cm$^3$.

The test specimen was placed on a scale, and the scale was tared. A durometer was then placed on the test specimen. A force was applied to the durometer until the scale read a mass of 2400 grams. This method assured standardization of the force applied to the test material. The hardness was read on the durometer digital scale in Asker C of 12.

Samples of polyurethane memory foam having the composition of this Example were then prepared in a free rise wood block mold having dimensions of 15"×15"×4". The foam samples were then tested according to the ASTM D3574-03 B1 standard. The test results revealed that most memory foam samples exhibited an IFD of 25%. The biobased content of the polyurethane memory foam composition of this Example was 75.4%.

Example 11

Preparation of Polyurethane Memory Foam as a Free Rise Bun, in Open Air and not in a Mold, to Test for Formation of Polyurethane Product Used for Memory Foam for Slab-Stock Applications To a 200 mL glass container was added 80 grams of the molten (at 50° C.) polyester resin obtained in Example 5. To this was then added 8 grams of the plasticizer tributyl citrate (available from Jungbunzlauer as CITROFOL®), 1.36 grams of TEGOSTAB B8325® surfactant (available from Evonik), 0.08 grams of Otregol 501 PF (available from Evonik), 2.4 grams of the chain extender 1,3-propanediol, 0.32 grams of DABCO LV® catalyst (available from Evonik), and 1.2 grams of water. The mixture was maintained at 50 to 55° C. for 5 minutes, and then homogenized at 1500 rpm for 4 minutes. After homogenization, 36.60 milliliters of a polymethylene polyphenylisocyanate (MDI) (available from DOW as PAPI™ 94) was added with a syringe, and the mixture was further homogenized for 5 seconds. The mixture was then poured into a cup, and a foam formed by reaction of the polyester polyol mixture with MDI isocyanate, generating a free rise bun. The free rise bun was formed with a cream time of about 30 to 34 seconds, a tack free time of about 210 to about 220 seconds, a demold time of 25 minutes, resulting in a density of 0.07 g/cm$^3$ and a hardness of 12 (as determined using a durometer). There was no shrinkage or scorching. The foam was cut into test specimens having regular dimensions of suitable length, width and thickness, and the mass was measured by an analytical scale in grams. The density of the resulting free rise foam was determined from the volume estimated from L×W×T (1 centimeter×1 centimeter×4 centimeters=4 centimeters³) in accordance with the methodology of the ASTM D7487-13 standard.

The density of the foam was measured as 0.07+/−1 g/cm³ the, where density=mass/volume.

As an example, mass=0.28 g, volume=4 cm³, hence the foam density=0.07 g/cm³.

The test specimen was placed on a scale, and the scale was tared. A durometer was then placed on the test specimen. A force was applied to the durometer until the scale read a mass of 2400 grams. This method assured standardization of the force applied to the test material. The hardness was read on the durometer digital scale in Asker C of 12.

Samples of polyurethane memory foam having the composition of this Example were then prepared in a free rise wood block mold having dimensions of 15"×15"×4". The foam samples were then tested according to the ASTM D3574-03 B1 standard. The test results revealed that most memory foam samples exhibited an IFD of 27%. The biobased content of the polyurethane memory foam composition of this Example was 75.1%.

Example 12

Preparation of Polyurethane Memory Foam as a Free Rise Bun, in Open Air and not in a Mold, to Test for Formation of Polyurethane Product Used for Pillow Application To a 200 mL glass container was added 40 grams of the molten (at 50° C.) polyester resin obtained in Example 6. To this was then added 4 grams of the plasticizer tributyl citrate (available from Jungbunzlauer as CITROFOL®), 0.4 grams of TEGOSTAB B83® surfactant (available from Evonik), 0.14 grams of Glycerol (available from Sigma Aldrich), 0.042 grams of Otregol 501 PF (available from Evonik), 0.8 grams of the chain extender 1,3-propanediol, 0.16 grams of DABCO LV® catalyst (available from Evonik), and 0.8 grams of water. The mixture was maintained at 50 to 55° C. for 5 minutes, and then homogenized at 1500 rpm for 4 minutes. After homogenization, 31.81 milliliters of a polymethylene polyphenylisocyanate (MDI) (available from DOW as PAPI™ 94) was added with a syringe, and the mixture was further homogenized for 5 seconds. The mixture was then poured into a cup, and a foam formed by reaction of the polyester polyol mixture with MDI isocyanate, generating a free rise bun. The free rise bun was formed with a cream time of about 30 to 34 seconds, a tack free time of about 210 to about 220 seconds, a demold time of 25 minutes, resulting in a density of 0.10 g/cm³ and a hardness of 13 (as determined using a durometer). There was no shrinkage or scorching. The foam was then cut into test specimens having regular dimensions of suitable length, width and thickness, and the mass was measured by an analytical scale in grams. The density of the resulting free rise foam was determined from the volume estimated from L×W×T (1 centimeter×1 centimeter×4 centimeters=4 centimeters³) in accordance with the methodology of the ASTM D7487-13 standard.

The density of the foam was measured as 0.10+/−1 g/cm³ the, where density=mass/volume.

As an example, mass=0.40 g, volume=4 cm³, hence the foam density=0.10 g/cm³.

The test specimen was placed on a scale, and the scale was tared. A durometer was then placed on the test specimen. A force was applied to the durometer until the scale read a mass of 2400 grams. This method assured standardization of the force applied to the test material. The hardness was read on the durometer digital scale in Asker C of 13.

Samples of polyurethane memory foam having the composition of this Example were then prepared in a free rise wood block mold having dimensions of 15"×15"×4". The foam samples were then tested according to the ASTM D3574-03 B1 standard. The test results revealed that most memory foam samples exhibited an IFD of 24.7%. The biobased content of the polyurethane memory foam composition of this Example was 75.2%.

The claims, as originally presented and as they may be amended, include alternatives, modifications, improvements, equivalents, and substantial equivalents of the disclosed embodiments and teachings, including those that are presently unforeseen, or unappreciated, and that, for example, may arise from applicants/patentees and others. Unless specifically recited in a claim, steps, or components of claims should not be implied, or imported from the specification, or any other claims as to any particular order, number, position, size, shape, angle, color, or material. Percent (%) by weight is a known quantity and is usually based on the total of the components present divided by the specific component present.

What is claimed is:

1. A polyurethane elastomer memory foam composition comprising an organic diisocyanate, a chain extender, a polyurethane crosslinker, a plasticizer, a surfactant, a foaming agent, and a polyester resin, the polyester resin being a random copolymer having randomly distributed subunits of formula 1

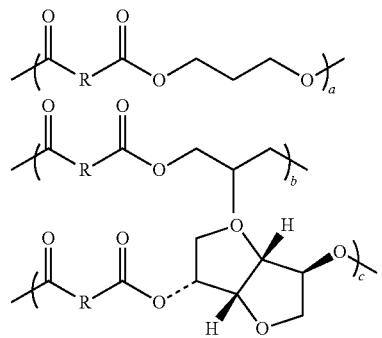

where:
  each R is independently selected from the group consisting of ethylene, octylene, and decylene,
  a is from about 1 to about 99 mole % of the polyester resin,
  b is from about 1 to about 99 mole % of the polyester resin,
  c is from about 0.1 to about 10 mole % of the polyester resin, and
  a+b+c=100 mole % of the polyester resin,
  wherein the polyurethane crosslinker provides crosslinking of the resulting polyurethane elastomer.

2. The polyurethane elastomer memory foam composition of claim 1, wherein R is the same for all subunits and is ethylene, octylene, or decylene.

3. The polyurethane elastomer memory foam composition of claim 1, wherein, in the polyester resin of formula 1:
  a is from about 40 to about 50 mole % of the polyester resin, b is from about 40 to about 50 mole % of the polyester resin, and c is from about 0.1 to about 10 mole % of the polyester resin.

4. A polyurethane elastomer memory foam prepared from the polyurethane elastomer memory foam composition of claim 1, wherein said polyurethane elastomer memory foam has an indentation force deflection (IFD) rating at 25% compression of from about IFD 10 to about IFD 15, a density of from about 25 to 125 kg/cm$^3$, a hysteresis loss of from 40 to 60%, a recovery time of from about 3 to about 8 seconds, and a 50% compression set of less than 5%.

5. A polyurethane elastomer memory foam prepared from the polyurethane elastomer memory foam composition of claim 1, wherein said polyurethane elastomer memory foam has a hardness value of from about 15 to about 60 Asker C, a tensile strength of from about 1 to about 10 MPa, a resilience of from about 25 to about 60%, an elongation at break of from about 150 to about 700%, and a tear strength of from about 2 to about 4 Newtons/millimeters$^2$.

6. The polyurethane elastomer memory foam composition of claim 1, wherein the bio-content of the polyurethane elastomer foam is from about 70 to about 85 weight %.

7. The polyurethane elastomer memory foam composition of claim 1, wherein said polyester resin is generated from the reaction of an organic diacid and an organic diol component, wherein said organic diacid is selected from the group consisting of succinic acid, sebacic acid, and 1,12-dodecanedioic acid, and said organic diol component consists of 1,2-propylene glycol, 1,3-propanediol, and isosorbide.

8. The polyurethane elastomer memory foam composition of claim 7, further comprising an additional polyester resin generated from the reaction of an additional organic diacid and an additional organic diol component, wherein said additional organic diacid is selected from the group consisting of succinic acid, sebacic acid, 1,12-dodecanedioic acid, a dimer diacid, and polymerized fatty acids, and said additional organic diol component consists of 1,2-propylene glycol, 1,3-propanediol, and isosorbide.

9. The polyurethane elastomer memory foam composition of claim 1, wherein said organic diisocyanate is selected from the group consisting of diphenylmethane 4,4'-diisocyanate, isophorone diisocyanate, dicyclohexylmethane 4,4-diisocyanate, hexamethylene 1,6-diisocyanate, naphthalene 1,5-diisocyanate, and mixtures thereof.

10. The polyurethane elastomer memory foam composition of claim 1, wherein said plasticizer is selected from the group consisting of tributyl-citrate, an ester, triethyl-citrate, trimethyl-citrate, an adipate, alkyl aryl phthalates, and alkyl benzyls.

11. The polyurethane elastomer memory foam composition of claim 1, wherein said surfactant is selected from the group consisting of a polyether-silicone oil, a silicone surfactant of sodium dodecylbenzene sulfonate, sodium dodecylnaphthalene sulfate, dialkyl benzenealkyl, adipic acid, polyvinyl alcohol, polyacrylic acid, methalose, methyl cellulose, and ethyl cellulose.

12. The polyurethane elastomer memory foam composition of claim 1, wherein said chain extender is selected from the group consisting of polyhydric alcohols, alkylene diols and alkylene glycols, and wherein the polyurethane elastomer memory foam composition further comprises a catalyst.

13. The polyurethane elastomer memory foam composition of claim 1, wherein said polyurethane crosslinker is selected from the group consisting of diethanolamine, glycerol, trimethylol propane, pentaerythritol, 1,2,4-butanetriol, thioglycolic acid, 2,6-dihydroxybenzoic acid, melamine, and mixtures thereof.

14. The polyurethane elastomer memory foam composition of claim 1, further comprising a colorant.

15. The polyurethane elastomer memory foam composition of claim 14, wherein said colorant is a dye present in an amount of from about 0.5 to about 5% by weight of the polyurethane elastomer memory foam composition.

16. The polyurethane elastomer memory foam composition of claim 1, further comprising an additive selected from the group consisting of chitin, chitosan, hazelnut shells, walnut shells, peanut shells, Brazilian nutshells, pecan shells, cashew nutshells, almond shells, chestnut shells, macadamia nutshells, nutmeg, pistachio nutshells, pine nutshells, cellulose, cornplast, lignin, and mixtures thereof.

17. The polyurethane elastomer memory foam composition of claim 16, wherein said additive is present in an amount of from about 0.1 to about 5% by weight of the polyurethane elastomer memory foam composition.

18. The polyurethane elastomer memory foam composition of claim 1, wherein said polyester resin is selected from the group consisting of: terpoly (1,2-propylene-succinate)-terpoly (1,3-propylene-succinate)-terpoly (1,3-isosorbidyl-succinate); terpoly (1,2-propylene-sebacate)-terpoly (1,3-propylene-sebacate)-terpoly (1,3-isosorbidyl-sebacate); terpoly (1,2-propylene-sebacate)-terpoly (1,3-propylene-sebacate)-terpoly (1,3-isosorbidyl-sebacate); terpoly (1,2-propylene-decanoate)-terpoly (1,3-propylene-decanoate)-terpoly (1,3-isosorbidyl-decanoate); and mixtures thereof.

19. The polyurethane elastomer memory foam composition of claim 1, wherein the polyurethane crosslinker is selected from the group consisting of: 1,2,4-butanetriol; thioglycolic acid; 2,6-dihydroxybenzoic acid; melamine, diglycolamine; 1,2,6-hexanetriol; 1,1,1-trimethylolethane; triisopropanol amine; triethanol amine; tartaric acid; citric acid; malic acid; trimesic acid; trimellitic acid; trimellitic anhydride; pyromellitic acid; pyromellitic dianhydride; trimethylolethane; and polyethertriols.

* * * * *